(12) United States Patent
Sauter et al.

(10) Patent No.: US 9,874,404 B2
(45) Date of Patent: Jan. 23, 2018

(54) EXHAUST GAS HEAT EXCHANGER

(75) Inventors: Frank Sauter, Leinfelden-Echterdingen (DE); Christian Schleicher, Leinfelden-Echterdingen (DE); Hermann Knaus, Stuttgart (DE); Heinz Czemmel, Rutesheim (DE); David Darriet, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 856 days.

(21) Appl. No.: 13/458,052

(22) Filed: Apr. 27, 2012
(Under 37 CFR 1.47)

(65) Prior Publication Data
US 2012/0305220 A1 Dec. 6, 2012

Related U.S. Application Data

(63) Continuation of application No. PCT/EP2010/065995, filed on Oct. 22, 2010.

(30) Foreign Application Priority Data

Oct. 27, 2009 (DE) .......................... 10 2009 050 884

(51) Int. Cl.
 *F28F 9/02* (2006.01)
 *F28D 7/16* (2006.01)
 (Continued)

(52) U.S. Cl.
 CPC ........... *F28D 7/1684* (2013.01); *F02M 26/11* (2016.02); *F02M 26/32* (2016.02); *F28D 7/1653* (2013.01);
 (Continued)

(58) Field of Classification Search
 CPC ............ F28D 21/0003; F28F 2255/146; F28F 9/0219
 (Continued)

(56) References Cited

U.S. PATENT DOCUMENTS 3,250,319 A * 5/1966 Vogt ................................ 165/81
5,105,787 A * 4/1992 Imoehl ........................ 123/469
 (Continued)

FOREIGN PATENT DOCUMENTS

DE         49 09 664 A1   8/1991
DE    10 2006 051 000 A1   7/2007
 (Continued)

OTHER PUBLICATIONS

Bravo, WO2008049648TRANS (English Translation), May 2008, WIPO.*
Gracia, WO2008125485TRANS (English Translation), Oct. 2008.*

*Primary Examiner* — Justin Jonaitis
*Assistant Examiner* — Eric Ruppert
(74) *Attorney, Agent, or Firm* — Muncy, Geissler, Olds & Lowe, P.C.

(57) ABSTRACT

An exhaust gas heat exchanger includes at least one diffuser for feeding and/or discharging an exhaust gas flow, an exchanging region including exchanging tubes which extend in an axial direction and which are connected to a base at one end, and a housing through which a cooling agent can flow and which is made of a material that is non-resistant to high temperatures. A connecting element is partly embedded in the housing in order to secure the connecting element to the housing. The connecting element is bonded to the base in a first bonding region and the base is bonded to the diffuser in a second bonding region.

11 Claims, 3 Drawing Sheets

(51) Int. Cl.
  *F28F 21/06* (2006.01)
  *F28F 21/08* (2006.01)
  *F02M 26/11* (2016.01)
  *F02M 26/32* (2016.01)
  *F28D 21/00* (2006.01)

(52) U.S. Cl.
  CPC .......... *F28F 9/0219* (2013.01); *F28F 21/067* (2013.01); *F28F 21/081* (2013.01); *F28F 21/084* (2013.01); *F28D 21/0003* (2013.01); *F28F 2255/146* (2013.01); *F28F 2275/067* (2013.01); *Y02T 10/16* (2013.01); *Y10T 29/4935* (2015.01); *Y10T 29/49393* (2015.01)

(58) Field of Classification Search
  USPC .... 165/41, 173, 158, 157; 285/288.5, 288.6, 285/416
  See application file for complete search history.

(56) References Cited

U.S. PATENT DOCUMENTS

| | | | |
|---|---|---|---|
| 5,152,338 A | * | 10/1992 | Dethier et al. ............ 165/170 |
| 6,570,993 B1 | | 5/2003 | Fukuyama |
| 2002/0162651 A1 | | 11/2002 | Nakagome et al. |
| 2005/0051314 A1 | * | 3/2005 | Heier ........................ 165/173 |
| 2005/0126768 A1 | | 6/2005 | Dilley et al. |
| 2005/0161206 A1 | * | 7/2005 | Ambros et al. ............ 165/173 |
| 2008/0053644 A1 | | 3/2008 | Beetz et al. |
| 2008/0289804 A1 | * | 11/2008 | Baumann et al. .......... 165/157 |
| 2010/0071871 A1 | | 3/2010 | Gaensler et al. |

FOREIGN PATENT DOCUMENTS

| | | | | |
|---|---|---|---|---|
| DE | 10 2007 031 419 A1 | | 1/2008 | |
| DE | 10 2006 040 851 A1 | | 3/2008 | |
| DE | 10 2007 010 474 A1 | | 7/2008 | |
| DE | 10 2007 010 134 A1 | | 9/2008 | |
| EP | 1 544 564 A1 | | 6/2005 | |
| GB | 145190 | * | 4/1919 | |
| GB | 741476 | * | 7/1952 | |
| JP | H 07-294551 A | | 11/1995 | |
| JP | H 11-192455 A | | 7/1999 | |
| JP | 2002-168586 | | 6/2002 | |
| JP | 2002-283384 A | | 10/2002 | |
| WO | WO2007113320 | * | 10/2007 | |
| WO | WO 2008/049648 A1 | | 5/2008 | |
| WO | WO2008049648 | * | 5/2008 | |
| WO | WO 2008125485 | * | 10/2008 | ........... F28D 7/0083 |

* cited by examiner

EXHAUST GAS HEAT EXCHANGER

This nonprovisional application is a continuation of International Application No. PCT/EP2010/065995, which was filed on Oct. 22, 2010, and which claims priority to German Patent Application No. DE 10 2009 050 884.8, which was filed in Germany on Oct. 27, 2009, and which are both herein incorporated by reference.

BACKGROUND OF THE INVENTION

Field of the Invention

The invention relates to an exhaust gas heat exchanger, in particular for a motor vehicle, having at least one diffuser for feeding and/or discharging an exhaust gas flow, an exchanger region having exchanger tubes which extend in the axial direction and which are bonded to a base at one end, a housing through which a coolant is able to flow and which is made of a material which is non-resistant to high temperatures, in particular plastic or aluminum. The invention furthermore relates to a method for manufacturing an exhaust gas heat exchanger of this type.

Description of the Background Art

The German patent application DE 10 2007 031 419 A1 discloses an exhaust gas cooler in which the housing is connected by screw connecting elements to a diffuser and/or a base, with sealing elements connected therebetween. To prevent heat input into the housing, the housing must not be connected to the diffuser and/or base by means of soldering or welding. A charge air cooler having flow channels made of metallic hollow bodies, whose longitudinal end faces are each coated with plastic to form a common tube base, is known from the German patent application DE 10 2006 040 851 A1, which corresponds to US 20080053644.

SUMMARY OF THE INVENTION

It is therefore an object of the invention to provide an exhaust gas heat exchanger that is easy to construct and cost-effective to manufacture.

In an exhaust gas heat exchanger, in particular for a motor vehicle, comprising: at least one diffuser for feeding and/or discharging an exhaust gas flow; an exchanger region having exchanger tubes which extend in the axial direction and which are connected to a base at one end; a housing through which a coolant is able to flow and which is made of a material which is non-resistant to high temperatures, in particular plastic or aluminum, this object is achieved by the fact that a connecting element is partially embedded into the housing in order to attach the connecting element to the housing, the connecting element being bonded to the base in a first bonding region, the base being bonded to the diffuser in a second bonding region. This provides the advantage that the known screw connecting elements may be eliminated. In addition, the tightness may be improved by the bonds, so that one or both conventional sealing elements may be eliminated if possible. The exhaust gas heat exchanger is preferably designed as an exhaust gas cooler. A bypass damper may be integrated into the diffuser. The exchanger region is preferably delimited by a base at each of the two ends.

In an embodiment, the exhaust gas heat exchanger has a connecting element that is designed as a frame. The shape of the frame may be adapted to the shape of the base in the first bonding region. The shape of the base is adapted to the shape of the diffuser, or vice versa, in the second bonding region.

In another embodiment, the exhaust gas heat exchanger has a connecting element that has a flange-like circumferential joint edge region which, in the first bonding region, is welded to a flange-like circumferential base edge region which is provided on the base. The circumferential edge regions are preferably outer circumferential edge regions. The bond is preferably created by laser welding.

In another embodiment, the exhaust gas heat exchanger has a diffuser that has a diffuser edge region which is welded to the base in the second bonding region. The bond is preferably created by laser welding.

In another embodiment, the exhaust gas heat exchanger has two bonding regions that are disposed on different planes of the base. The disposition on the different planes is preferably designed in such a way that the two bonding regions are easily accessible simultaneously or consecutively in order to carry out the welding.

In another embodiment, the exhaust gas heat exchanger has a housing that is made of plastic or aluminum and the connecting element is made of high-grade steel. The housing is preferably designed as an injection molded part made of plastic.

In another embodiment, the exhaust gas heat exchanger has a connecting element that is partially coated with the material from which the housing is made. The material can be a plastic material from which the housing is manufactured by an injection molding method, the connecting element being partially coated at the same time.

In another embodiment, the exhaust gas heat exchanger has diffuser that is made of metal, for example, a metal sheet or metal casting material. The diffuser may also have a flange-like circumferential edge region in the second bonding region.

In a method for manufacturing an exhaust gas heat exchanger as described above, the object specified above is alternatively or additionally achieved by the fact that, during injection molding of the housing, the connecting element is partially coated with the material from which the housing is made by injection molding. The housing, with the connecting element partially embedded therein, is preferably manufactured by an injection molding method.

In an embodiment of the method, the base can be welded to the connecting element in the first bonding region, after which the base is welded to the diffuser in the second bonding region. The welding processes preferably take place consecutively in the two bonding regions by means of laser welding.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
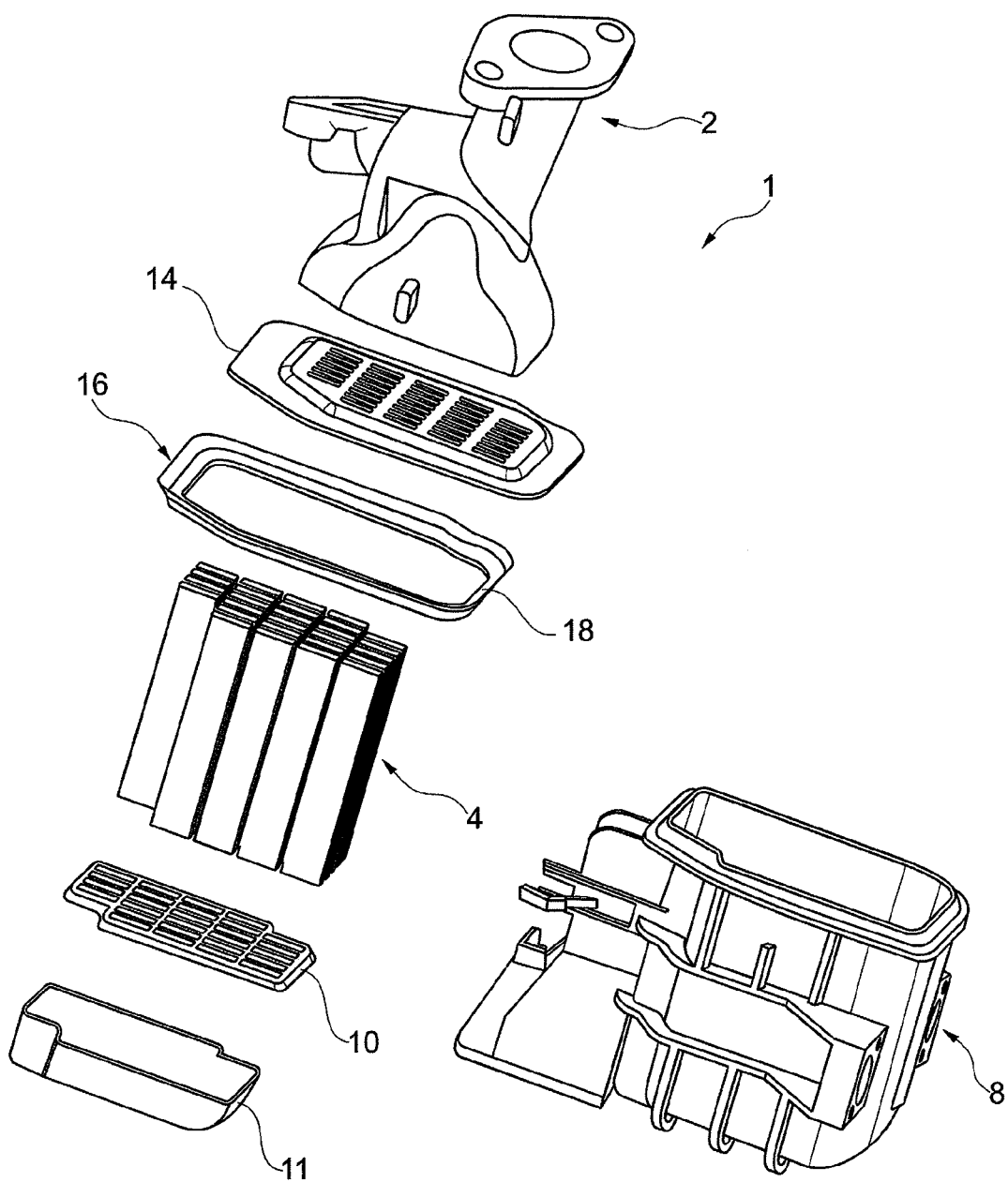
FIG. 1 shows an exploded view of an exhaust gas heat exchanger according to the invention.

FIGS. 1 through 4 show an exhaust gas heat exchanger 1 in different views or states of assembly or manufacture. Exhaust gas heat exchanger 1 comprises a diffuser 2 and an exchanger region 4. Exchanger region 4 preferably comprises a plurality of exchanger tubes running in one direction, and the exchanger region is accommodated in a housing 8 made of plastic or aluminum. The ends of the exchanger tubes are welded to a base 10 at one end of exchanger region 4.

The flow through exchanger region 4 is deflected by means of a deflecting flap 11, which may be welded to base 10. Deflecting flap 11, along with base 10, is disposed in housing 8 in the mounted state in such a way that the ends of the exchanger tubes of exchanger region 4 which face away from base 10 empty into a base 14 to which these ends of the exchanger tubes are welded. A coolant flows around the exchanger tubes in exchanger region 4 between bases 10 and 14 in housing 8 in order to cool an exhaust gas flow flowing through the exchanger tubes.

According to one important aspect of the invention, a connecting element 16 in the form of a frame 18 made of high-grade steel is partially embedded into housing 8. Housing 8 is preferably manufactured from plastic by means of an injection molding method. Frame 18, which represents connecting element 16, is inserted into an injection molding die and partially coated with plastic.

Figure 2:
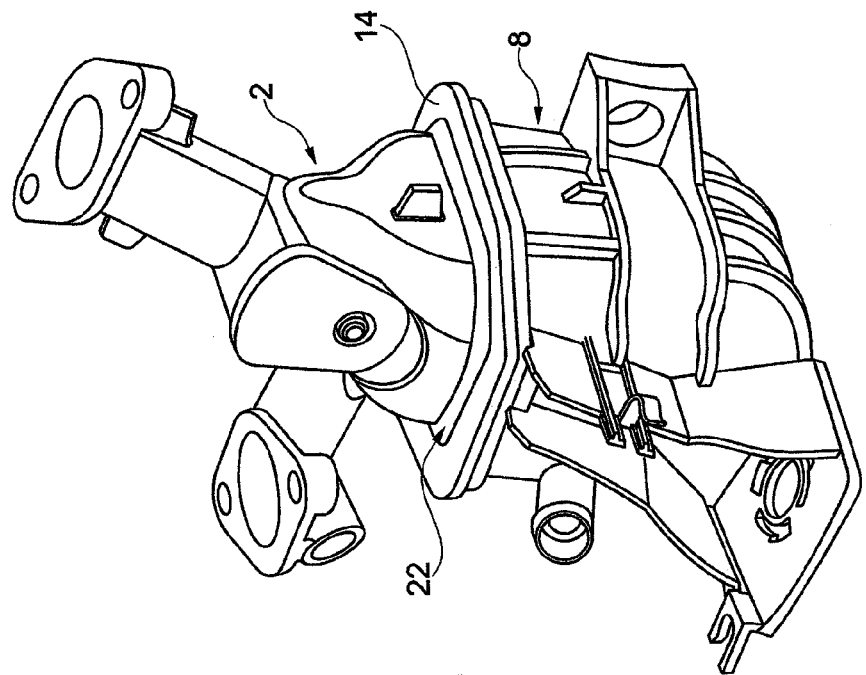
FIG. 2 shows a housing of the exhaust gas heat exchanger from FIG. 1 after a base has been welded to a connecting element.

FIG. 2 shows the fact that base 14 is welded to the frame or to connecting element 16 in a first bonding region 21 by means of laser welding. First bonding region 21 is disposed on an outer circumferential edge of frame 18 and base 14 in such a way that it is easily accessible to a corresponding laser welding device.

Figure 3:
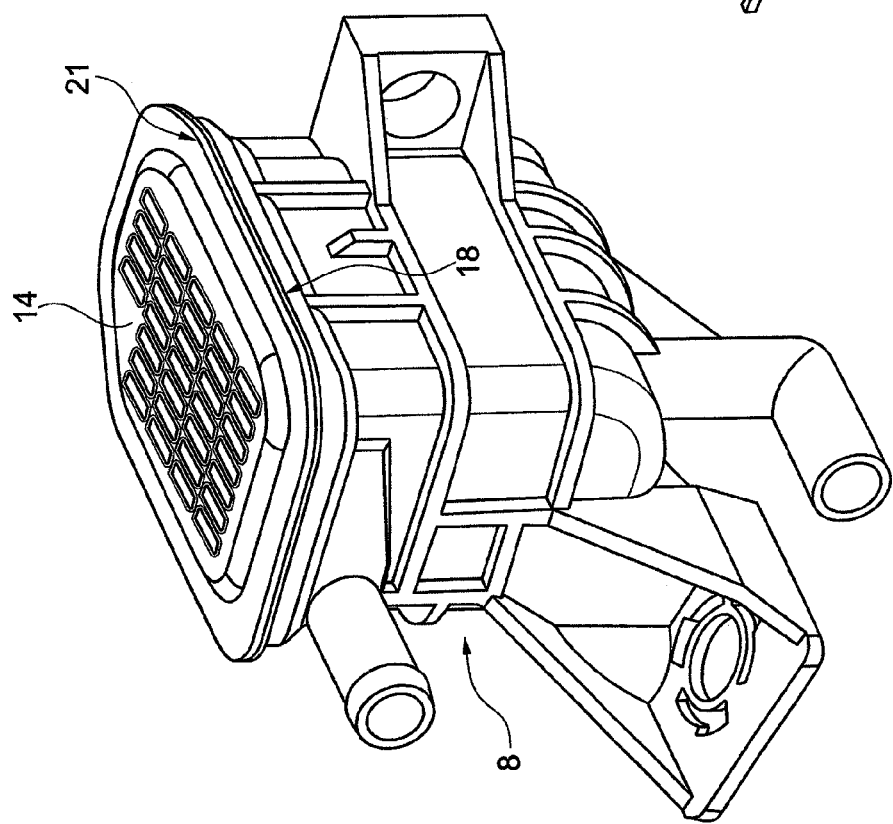
FIG. 3 shows the housing from FIG. 2 after a diffuser has been welded to the base.

FIG. 3 shows the fact that diffuser 2 is welded to base 14 in a second bonding region 22, preferably also by means of laser welding. Second bonding region 22 is also easily accessible to the laser welding device.

Figure 4:
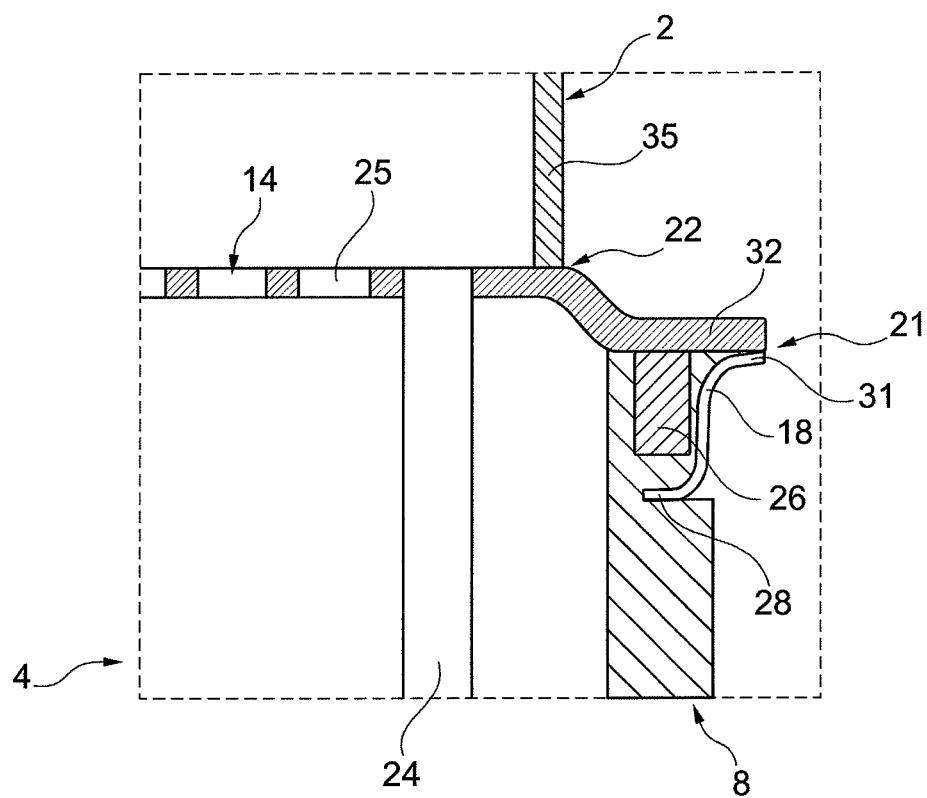
FIG. 4 shows a sectional view of the welded joints from FIGS. 2 and 3.

FIG. 4 shows a sectional representation of the two bonding regions 21, 22. In the sectional view, it is apparent that an exchanger tube 24 of exchanger region 4 is bonded to a base member 25 of base 14 at one end, preferably by means of welding. Base member 25 largely has the shape of a flat plate and is provided with through-holes through which the exhaust gas flow enters exchanger tubes 24 of exchanger region 4.

To provide a seal between base 14 and housing 8, a seal 26 is accommodated in an annular groove which has a rectangular annular cross section of housing 8. A web 28 is embedded into housing 8 at some distance from seal 26 by means of injection molding. Web 28 belongs to frame 18 and is connected to a flange-like circumferential joint edge region 31 to form a single piece.

At flange-like circumferential joint edge region 31, frame 18 is welded to circumferential base edge region 32 of base 14 in first bonding region 21. Circumferential base edge region 32 extends approximately parallel to base member 25 of base 14 on another plane.

On the outer circumference of base member 25, base 14 is welded to a diffuser edge region 35 of diffuser 2 in second bonding region 22. As shown in the representation in FIG. 4, both first bonding region 21 and second bonding region 22 are easily accessible to a laser welding device in order to introduce the thermal energy required for welding into the two bolding regions 21, 22 in the form of laser radiation.

In manufacturing housing 8 along with connecting element 16 or frame 18 embedded therein, seal 26 may also be injected directly into housing 8. Seal 26 is preferably made of an elastomer plastic material.

To manufacture exhaust gas heat exchanger 1, the exchanger tubes of exchanger region 4 are first disposed between bases 10 and 14. This disposition of the exchanger tubes between bases 10 and 14 is also referred to as bundling the exchanger tubes. The ends of the tubes are subsequently welded to bases 10, 14, preferably by means of laser welding. After a subsequent check of the seal, deflection flap 11 is welded to base 10.

Exchanger region 4, together with bases 10 and 14 as well as deflection flap 11, may then be inserted into housing 8. Housing 8 may then be positioned in a laser welding device. Diffuser 2 is subsequently positioned on base 14. Finally, base 14 may be welded to frame 18 or connecting element 16 and diffuser 2 may be welded to base 14, either consecutively or simultaneously. After a final check of the seal, exhaust gas heat exchanger 1 is finished.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust gas heat exchanger for a motor vehicle, the exhaust gas heat exchanger comprising:
    at least one diffuser configured to feed and/or discharge an exhaust gas flow;
    an exchanger region having exchanger tubes that extend in an axial direction and which are connected to a base at one end, the base comprising:
        a base member; and
        a circumferential base edge region extending parallel to the base member along a plane different from that of the base member;
    a housing through which a coolant flows;
    a connecting element that is partially embedded into the housing in order to attach the connecting element to the housing, the connecting element being bonded to the base in a first bonding region and the base being bonded to the diffuser in a second bonding region; and
    a seal disposed in an annular groove of the housing between the housing and the base, the seal being disposed against the circumferential base edge region,
    wherein the connecting element comprises:
        a frame;
        web, disposed at a first end of the frame and extending perpendicular to the frame, embedded into the housing; and
        a circumferential flange, disposed at a second end of the frame and extending in a different plane than the web, welded to the circumferential base edge region, and
    wherein the housing is made of a material of plastic or aluminum and the connecting element is made of steel and is partially coated with the material from which the housing is made.

2. The exhaust gas heat exchanger according to claim 1, wherein the diffuser has a diffuser edge region that is welded to the base in the second bonding region.

3. The exhaust gas heat exchanger according to claim 1, wherein the two bonding regions are disposed on different planes of the base.

4. The exhaust gas heat exchanger according to claim 1, wherein the diffuser is made of metal, a metal sheet or a metal casting material.

5. The exhaust gas heat exchanger according to claim 1, wherein the exchanger region is accommodated within the housing.

6. The exhaust gas heat exchanger according to claim 1, further comprising a second base at an end of the exchanger region opposite the base.

7. The exhaust gas heat exchanger according to claim 6, wherein ends of the exchanger tubes are welded to the second base.

8. The exhaust gas heat exchanger according to claim 6, further comprising a deflecting flap welded to the second base.

9. The exhaust gas heat exchanger according to claim 1, wherein the base comprises through-holes through which exhaust gas flows.

10. A method for manufacturing an exhaust gas heat exchanger, comprising:
   forming at least one diffuser configured to feed and/or discharge an exhaust gas flow;
   forming an exchanger region having exchanger tubes that extend in an axial direction and which are connected to a base at one end, the base comprising:
      a base member; and
      a circumferential base edge region extending parallel to the base member along a plane different from that of the base member;
   injection molding a housing through which a coolant flows;
   forming a connecting element that is partially embedded into the housing in order to attach the connecting element to the housing, the connecting element being bonded to the base in a first bonding region and the base being bonded to the diffuser in a second bonding region; and
   forming a seal in an annular groove of the housing between the housing and the base, the seal being disposed against the circumferential base edge region,
   wherein the connecting element comprises:
      a frame;
      a web, disposed at a first end of the frame and extending perpendicular to the frame, embedded into the housing; and
      a circumferential flange, disposed at a second end of the frame and extending in a different plane than the web, welded to the circumferential base edge region,
   wherein during injection molding of the housing, the connecting element is partially coated with the material from which the housing is made via injection molding, and
   wherein the housing is made of a material of plastic or aluminum.

11. The method according to claim 10, wherein the base is welded to the connecting element in the first bonding region, after which the base is welded to the diffuser in the second bonding region.

* * * * *